(12) United States Patent
Zhang et al.

(10) Patent No.: US 9,892,314 B2
(45) Date of Patent: Feb. 13, 2018

(54) METHOD AND DEVICE FOR DETERMINING ASSOCIATED USER

(71) Applicant: Xiaomi Inc., Beijing (CN)

(72) Inventors: Tao Zhang, Beijing (CN); Fei Long, Beijing (CN); Zhijun Chen, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/209,148

(22) Filed: Jul. 13, 2016

(65) Prior Publication Data

US 2017/0032180 A1    Feb. 2, 2017

(30) Foreign Application Priority Data

Jul. 31, 2015    (CN) .......................... 2015 1 0463635

(51) Int. Cl.
| | |
|---|---|
| G06K 9/00 | (2006.01) |
| G06Q 50/00 | (2012.01) |
| G06F 17/30 | (2006.01) |
| G06K 9/46 | (2006.01) |
| G06K 9/62 | (2006.01) |

(52) U.S. Cl.
CPC ... *G06K 9/00288* (2013.01); *G06F 17/30256* (2013.01); *G06F 17/30268* (2013.01); *G06K 9/00362* (2013.01); *G06K 9/00677* (2013.01); *G06K 9/4661* (2013.01); *G06K 9/6201* (2013.01); *G06K 9/6256* (2013.01); *G06Q 50/01* (2013.01); *G06K 2009/00322* (2013.01); *G06K 2009/00328* (2013.01)

(58) Field of Classification Search
None
See application file for complete search history.

(56) References Cited

U.S. PATENT DOCUMENTS

| | | | |
|---|---|---|---|
| 7,953,690 B2 | 5/2011 | Luo et al. | |
| 8,041,082 B1 | 10/2011 | Baluja et al. | |

(Continued)

FOREIGN PATENT DOCUMENTS

| | | |
|---|---|---|
| CN | 103399896 A | 11/2013 |
| CN | 104021150 A | 9/2014 |

(Continued)

OTHER PUBLICATIONS

International Search Report of PCT/CN2015/097611, mailed from the State Intellectual Property Office of China dated Apr. 22, 2016.

(Continued)

*Primary Examiner* — Sumati Lefkowitz
*Assistant Examiner* — David Perlman
(74) *Attorney, Agent, or Firm* — Finnegan, Henderson, Farabow, Garrett & Dunner LLP

(57) ABSTRACT

A method and device for determining an associated user are provided. The method includes: acquiring a face album including face sets of multiple users; determining a target user in the face album; selecting, from the face album, at least one associated-user candidate of the target user; acquiring attribute information of the at least one associated-user candidate, and determining an associated user of the target user according to the attribute information; and setting tag information for the associated user.

17 Claims, 12 Drawing Sheets

(56) References Cited

U.S. PATENT DOCUMENTS

| | | | |
|---|---|---|---|
| 8,588,482 | B1 | 11/2013 | Baluja et al. |
| 9,355,300 | B1 | 5/2016 | Baluja et al. |
| 2009/0192967 | A1 | 7/2009 | Luo et al. |
| 2009/0248703 | A1 | 10/2009 | Tsukagoshi et al. |
| 2010/0287053 | A1 | 11/2010 | Ganong et al. |
| 2011/0035406 | A1 | 2/2011 | Petrou |
| 2011/0038512 | A1 | 2/2011 | Petrou |
| 2011/0097694 | A1 | 4/2011 | Yeh et al. |
| 2011/0125735 | A1 | 5/2011 | Petrou |
| 2011/0292232 | A1* | 12/2011 | Zhang ............... G06F 17/30247 348/222.1 |
| 2012/0134590 | A1 | 5/2012 | Petrou |
| 2012/0278390 | A1 | 11/2012 | Tsukagoshi et al. |
| 2013/0114864 | A1 | 5/2013 | Garcia et al. |
| 2013/0117366 | A2 | 5/2013 | Tsukagoshi et al. |
| 2014/0161326 | A1 | 6/2014 | Ganong et al. |
| 2014/0164406 | A1 | 6/2014 | Petrou |
| 2014/0172881 | A1 | 6/2014 | Petrou |
| 2015/0032535 | A1* | 1/2015 | Li ..................... G06Q 30/0255 705/14.53 |
| 2016/0055182 | A1 | 2/2016 | Petrou |
| 2016/0086019 | A1 | 3/2016 | Ganong et al. |
| 2016/0100300 | A1* | 4/2016 | Van de Sompel .... H04W 4/206 455/456.1 |

FOREIGN PATENT DOCUMENTS

| | | |
|---|---|---|
| CN | 104299001 A | 1/2015 |
| CN | 104408402 A | 3/2015 |
| CN | 104715007 A | 6/2015 |
| CN | 105069083 A | 11/2015 |
| JP | 2004-227158 A | 8/2004 |
| JP | 2011-514575 A | 5/2011 |
| JP | 2012-79354 A | 4/2012 |
| JP | 2013-69024 A | 4/2013 |
| JP | 2014-194810 A | 10/2014 |
| KR | 10-2011-0055124 A | 5/2011 |
| KR | 10-1479260 B1 | 1/2015 |
| SU | 1755268 A1 | 8/1992 |
| WO | WO 2009/082814 A1 | 7/2009 |

OTHER PUBLICATIONS

Extended European Search Report of European Patent Application No. 16181897.6, from the European Patent Office, dated Oct. 17, 2016.

Andrew C. Gallagher et al., "Using a Markov Network to Recognize People in Consumer Images," Image Processing, IEEE, pp. 489-492, XP031158762, ISBW: 978-1-4244-1436-9, dated Sep. 1, 2007.

Office Action issued in Russian Application No. 2016119495/08(030707), from the Russian Federal Service for Intellectual Property, dated Oct. 9, 2017.

Office Action issued in Japanese Application No. 2016-532556, from the Japan Patent Office, dated Sep. 5, 2017.

* cited by examiner

METHOD AND DEVICE FOR DETERMINING ASSOCIATED USER

CROSS-REFERENCE TO RELATED APPLICATIONS

This application is based upon and claims priority to Chinese Patent Application No. 201510463635.X, filed Jul. 31, 2015, the entire contents of which are incorporated herein by reference.

TECHNICAL FIELD

The present disclosure generally relates to the field of image processing technology and, more particularly, to a method and device for determining an associated user.

BACKGROUND

With the rapid development of mobile terminal technology, various mobile terminals, such as mobile phones, have been in widespread use and are obtaining more and more powerful functions. For example, a user may use a mobile phone to take photos and share the photos with friends.

As a number of photos in the mobile phone increases, the user may want to create an album, such as a family album and the like. Conventionally, the user needs to manually find users that are associated and then execute certain operations to create an album according to the associated users. For example, if initially there is only an album of a baby, it may be necessary to manually find the users associated with the baby, i.e., the baby's father and mother, from a large number of photos to create a family album. However, manually determining of the associated users is tedious and may consume the user plenty of time.

SUMMARY

According to a first aspect of the present disclosure, there is provided a method for a device to determine an associated user, comprising: acquiring a face album including face sets of multiple users; determining a target user in the face album; selecting, from the face album, at least one associated-user candidate of the target user; acquiring attribute information of the at least one associated-user candidate, and determining an associated user of the target user according to the attribute information; and setting tag information for the associated user.

According to a second aspect of the present disclosure, there is provided a device, comprising: a processor; and a memory configured to store instructions executable by the processor; wherein the processor is configured to: acquire a face album including face sets of multiple users; determine a target user in the face album; select, from the face album, at least one associated-user candidates of the target user; acquire attribute information of the at least one associated-user candidate, and determine an associated user of the target user according to the attribute information; and set tag information for the associated user.

According to a third aspect of the present disclosure, there is provided a non-transitory computer-readable storage medium storing instructions that, when executed by a processor of a terminal, cause the terminal to perform a method, comprising: acquiring a face album including face sets of multiple users; determining a target user in the face album; selecting, from the face album, at least one associated-user candidate of the target user; acquiring attribute information of the at least one associated-user candidate, and determining an associated user of the target user according to the attribute information; and setting tag information for the associated user.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of the specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

Figure 1:
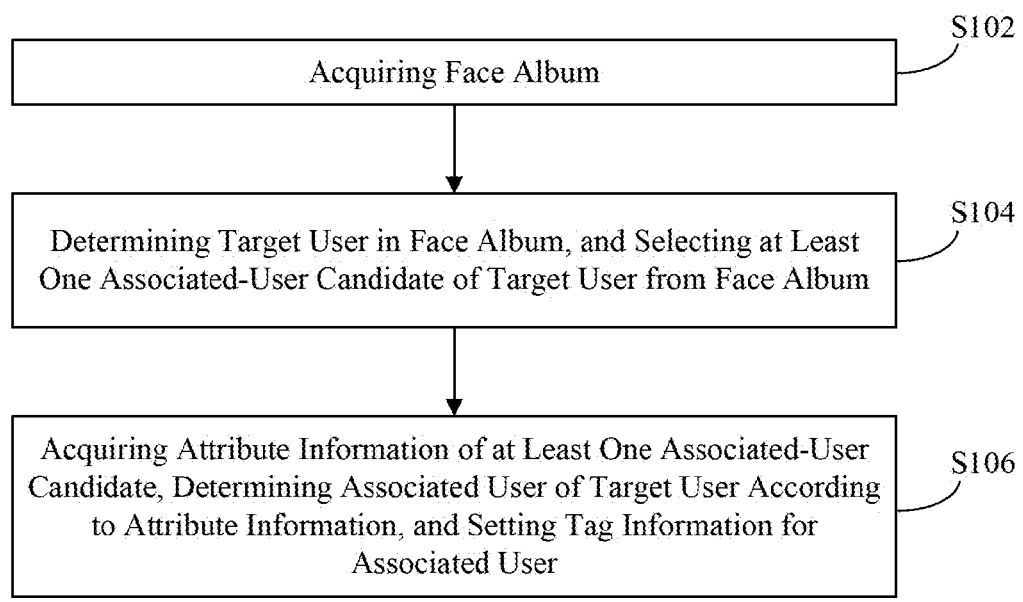
FIG. 1 is a flowchart of a method for determining an associated user, according to an exemplary embodiment.

FIG. 1 is a flowchart of a method 100 for determining an associated user, according to an exemplary embodiment. For example, the method 100 may be used in a mobile terminal. The mobile terminal may include, but not limited to, a mobile phone. Referring to FIG. 1, the method 100 includes the following steps S102-S106.

In step S102, the mobile terminal acquires a face album. The face album includes face sets of multiple users.

For example, when a user opens a "face album" application in the mobile terminal, the mobile terminal may acquire a face album from a server. The face album may include the face sets of multiple users.

Figure 2A:
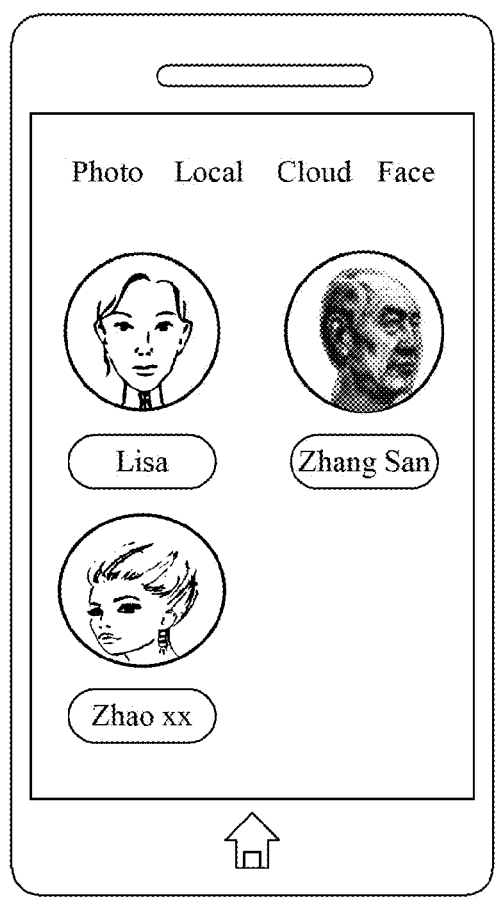
FIG. 2a is a schematic diagram illustrating a face album, according to an exemplary embodiment.
Figure 2B:
FIG. 2b is a schematic diagram illustrating a face set, according to an exemplary embodiment.

FIG. 2a is a schematic diagram illustrating a face album, according to an exemplary embodiment. As shown in FIG. 2a, the face album includes the face sets of multiple users. FIG. 2b is a schematic diagram illustrating a face set of a user, according to an exemplary embodiment. For example, FIG. 2b may show the face set of a user in the face album of FIG. 2a.

In step S104, the mobile terminal determines a target user in the face album, and selects from the face album at least one associated-user candidate of the target user.

For example, the target user may be a baby. After acquiring the face album, the mobile terminal may identify a face set of the baby from the face album. In one embodiment, the face album may include face sets of multiple babies. The mobile terminal may determine the target user according to the number of faces included in each baby's face set. For example, the album may include two face sets of two babies, respectively. If the face set of the first baby includes 4 faces while the face set of the second baby includes 50 faces, then the mobile terminal may determine the second baby to be the target user.

After the target user is determined, the mobile terminal may select the at least one associated-user candidate of the target user from the face album, according to the following manner acquiring face-source photos of all the users in the face album; comparing the face-source photos of the target user with the face-source photos of the other users; and determining a user who has more than a preset number of same face-source photos with the target user, and select this user as an associated-user candidate. The preset number may be flexibly set according to certain requirements. For example, the preset number may be 10, 15, and the like.

The face-source photos refer to the photos showing user faces. For example, if photo 1 includes face 1 and face 2, then photo 1 is a face-source photo of face 1 and face 2. If photo 2 includes face 3, the photo 2 is a face-source photo of face 3.

Next, to illustrate the manner of selecting the at least one associated-user candidate, it is assumed that the acquired face album may include 5 face sets of 5 users, respectively. The 5 users may be labeled as 1-5 respectively, with user 1 being the target user. The mobile terminal may acquire the face-source photos of the 5 users, and compare the face-source photos of users 2-5 with the face-source photos of user 1. For example, the mobile terminal may determine that user 2 and user 1 have 2 same face-source photos. That is, user 2 and user 1 have 2 group photos. Similarly, the mobile terminal may determine that user 3 and user 1 have 30 same face-source photos. That is, user 3 and user 1 have 30 group photos. User 4 and user 1 may be determined to have 33 same face-source photos. That is, user 4 and user 1 have 33 group photos. User 5 and user 1 may be determined to have 20 same face-source photos. That is, user 5 and user 1 have 20 group photos. If the preset number for determining an associated-user candidate is 10, then the mobile terminal may determine that users 3-5 are the associated-user candidates of the target user.

In step S106, the mobile terminal acquires attribute information of the at least one associated-user candidate, determines an associated user of the target user according to the attribute information, and sets tag information for the associated user.

After determining the at least one associated-user candidate of the target user, the mobile terminal may further acquire the attribute information of the at least one associated-user candidate, so as to determine the associated user of the target user according to the attribute information.

In one embodiment, the mobile terminal may acquire gender and age information of the at least one associated-user candidate. The mobile terminal may discard, according to the age information, an associated-user candidate not meeting an age requirement. The mobile terminal may determine, according to the gender information, whether a number of the remaining associated-user candidates exceeds the number of the associated users. If the number of the remaining associated-user candidates does not exceed the number of the associated users, the mobile terminal may determine the remaining associated-user candidates as the associated users. Otherwise, the mobile terminal may determine the associated users according to a preset condition, such as the face number(s) of the at least one associated-user candidate.

For example, user 3 may be a male and belong to an age group of 10-15, user 4 may be a female and belong to an age group of 25-30, and user 5 may be a male and belong to an age group of 28-35. The mobile terminal may discard user 3 because the age group of user 3 does not meet an age requirement, while determining that user 4 and user 5 meet the age requirement. Then the mobile terminal may further determine, according to the gender information of user 4 and user 5, that user 4 and user 5 meet a requirement on the number of the associated users. Accordingly, the mobile terminal may determine that user 4 and user 5 are the associated users of the target user. For example, user 4 may be the mother of the target user and user 5 may be the father of the target user.

However, if user 3 is a male and belongs to the age group of 25-30, users 3-5 all meet the age requirement. In this situation, both user 3 and user 5 are males and the remaining associated-user candidates exceed the number of the associated users. Thus, it may be necessary for the mobile terminal to further select an associated user from user 3 and user 5, according to a preset condition. For example, the mobile terminal may obtain the face numbers of user 3 and user 5, respectively, and determine that user 3 is an associated user of the target user, because the face number (i.e., 30) of user 3 is more than the face number (i.e., 20) of user 5.

As illustrated by the above example, the method 100 determines an associated user according to a preset condition. Thus, the determination of the associated user can be achieved conveniently and in high accuracy.

After determining the associated user(s) of the target user, the mobile terminal may set tag information for the associated user(s), so as to facilitate future operations based on the tag information. With continued reference to the above example, the tag information may be "father of the baby" or "mother of the baby," or in any forms suitable for representing the "father of the baby" or "mother of the baby." In addition, the mobile terminal may display the tag information. For example, the mobile terminal may display the tag information at the bottom or top of a user face in the face album. The mobile terminal may also superimpose the tag information above the user face, such as superimposing the tag information at certain position, e.g., the right upper corner, of the user face. The present disclosure does not limit the specific pattern or position of displaying the tag information.

Furthermore, after the tag information is set for the associated user(s), when the user triggers the operation of creating a family album, the mobile terminal may simultaneously extract the faces of the target user and the associated user(s) of the target user, instead of requiring the user to manually find the associated user(s) of the target user. The mobile terminal may then extract the faces of the associated user(s) one by one. In this manner, the album can be created conveniently and quickly.

Figure 3:
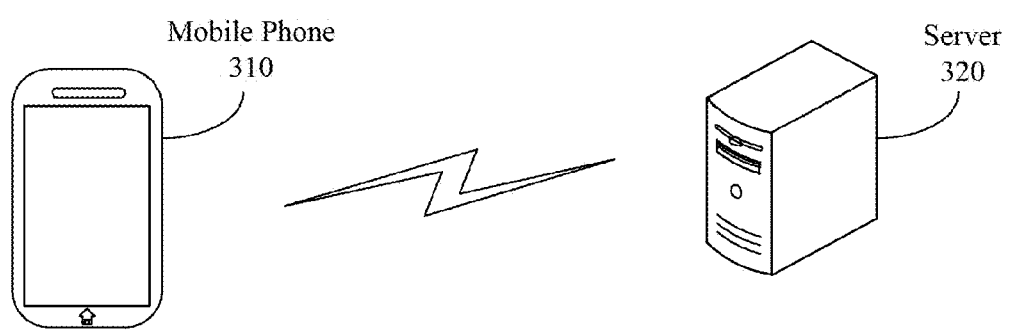
FIG. 3 is a schematic diagram illustrating an implementation environment for determining an associated user, according to an exemplary embodiment.

FIG. 3 is a schematic diagram illustrating an implementation environment 300 for determining an associated user, according to an exemplary embodiment. Referring to FIG. 3, the implementation environment 300 may include a mobile phone 310 and a server 320. For example, a user may use the mobile phone 310 to take many photos of the user's baby and the user self. The mobile phone 310 may simultaneously upload the photos to the server 320. When the user clicks and opens a "face album" application, the mobile phone 310 may acquire a face album from the server 320. Moreover, the mobile phone 310 may automatically identify a target user, such as the baby, and select at least one associated-user candidate from the face album. The mobile phone 310 may then acquire attribute information of the at least one associated-user candidate, and determine, according to the attribute information, the associated users of the target user, e.g., the father and mother of the baby. The mobile terminal 310 may further set tag information for the father and mother of the baby, thereby facilitating the performance of subsequent operations. As such, the determination of an associated user can be achieved conveniently and quickly, without requiring the user to manually go through the tedious operations of looking for the associated users. Therefore, the user's time is greatly saved.

Figure 4A:
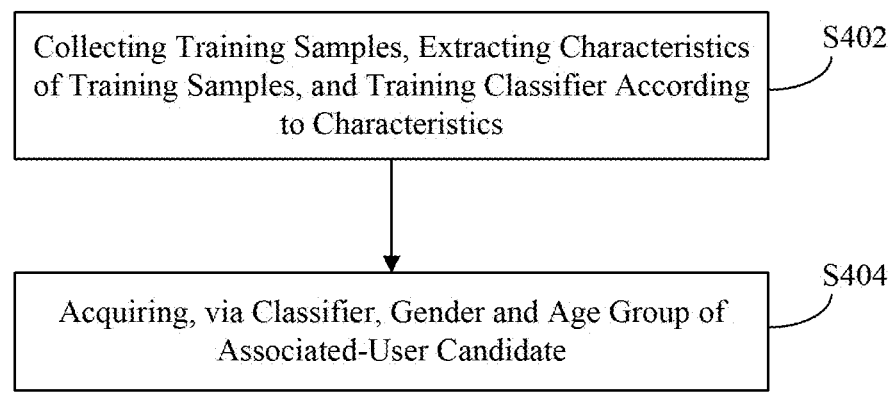
FIG. 4a is a flowchart of a method for acquiring attribute information of a user, according to an exemplary embodiment.

FIG. 4a is a flowchart of a method 400 for acquiring attribute information of a user, according to an exemplary embodiment. For example, the method 400 may be used in a mobile terminal, and the attribute information to be acquired may include gender and age information of an associated-user candidate. Referring to FIG. 4a, the method 400 may include the following steps S402-S404.

In step S402, the mobile terminal collects training samples, extracts characteristics of the training samples, and trains a classifier according to the characteristics.

In one embodiment, the mobile terminal acquires the gender and age information of the users as the attribute information. Accordingly, the mobile terminal collects gender training samples and age training samples, and extracts the characteristics of the respective training samples. The characteristics may include, but not limited to, a Gabor characteristic. The Gabor characteristic is a local characteristic measurement method used for describing the local characteristic of a texture. Further, the mobile terminal may train a classifier according to the characteristics. The classifier may be, but not limited to, a Support Vector Machine (SVM) classifier.

In step S404, the mobile terminal acquires, via the classifier, a gender and age group of the at least one associated-user candidate.

The face album may include multiple faces of an associated-user candidate. Thus, the mobile terminal may acquire, via the classifier, the gender and age information of all the faces of each associated-user candidate. The mobile terminal may also make statistical determination of the gender and age information of all the faces, and obtain the gender and age group of the associated-user candidate according to the statistical determination.

Figure 4B:
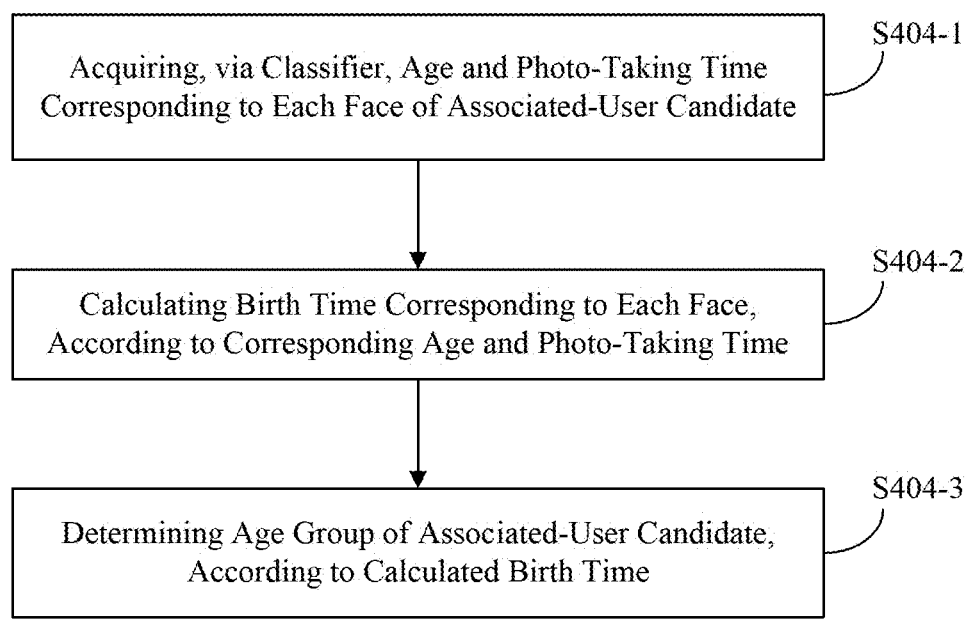
FIG. 4b is a flowchart of a step in the method of FIG. 4a, according to an exemplary embodiment.

FIG. 4b is a flowchart of step 404 of the method 400 (FIG. 4a), according to an exemplary embodiment. For example, step 404 may be performed by a mobile terminal to acquire age information of an associated-user candidate. Referring to FIG. 4b, step 404 may include the following sub-steps.

In step S404-1, the mobile terminal acquires, via a classifier, the age and a photo-taking time corresponding to each face of the associated-user candidate.

In step S404-2, the mobile terminal calculates a birth time corresponding to each face, according to the corresponding age and photo-taking time.

In step S404-3, the mobile terminal determines the age group of the associated-user candidate, according to the calculated birth time.

For example, the associated-user candidate may have 40 faces. Among the 40 faces, 10 faces correspond to a birth time of 1988, 8 faces correspond to a birth time of 1990, 7 faces correspond to a birth time of 1989, 8 faces correspond to a birth time of 1987, 2 faces correspond to a birth time of 1980, 2 faces correspond to a birth time of 1981, 2 faces correspond to a birth time of 1995, and 1 face corresponds to a birth time of 1996. Accordingly, if the current year is 2015, the mobile terminal may determine that the age group of the associated-user candidate to be 25-28. In this manner, the age group of the associated-user candidate can be accurately determined.

The above-described process for acquiring attribute information of an associated-user candidate is not limited to the age information. Instead, this process can be similarly applied to determine any type of attribute information. For another example, the mobile terminal may acquire, via the classifier, the gender corresponding to each face of the associated-user candidate. If the acquired genders are the same for all the faces of the associated-user candidate, the mobile terminal may determine the acquired gender as the gender of the associated-user candidate. If, however, the acquired genders are different, the mobile terminal may make a statistical determination as to which gender corresponds to a larger number of faces of the associated user candidate, and determine the gender corresponding to the larger number of faces as the gender of the associated-user candidate.

For example, an associated-user candidate may have 40 faces, among which 38 faces are determined to be male, and 2 faces are determined to be female. Accordingly, the mobile terminal may determine that the gender of the associated-user candidate is male. The gender determined in this manner has a high accuracy.

According to the disclosed embodiments, the method 400 first acquires the attribute information, such as gender and age information, corresponding to all the faces of an associated-user candidate, and then determines the gender and age group of the associated-user candidate, according to the acquired gender and age information. This way, the attribute information can be determined in a high accuracy.

Figure 5:
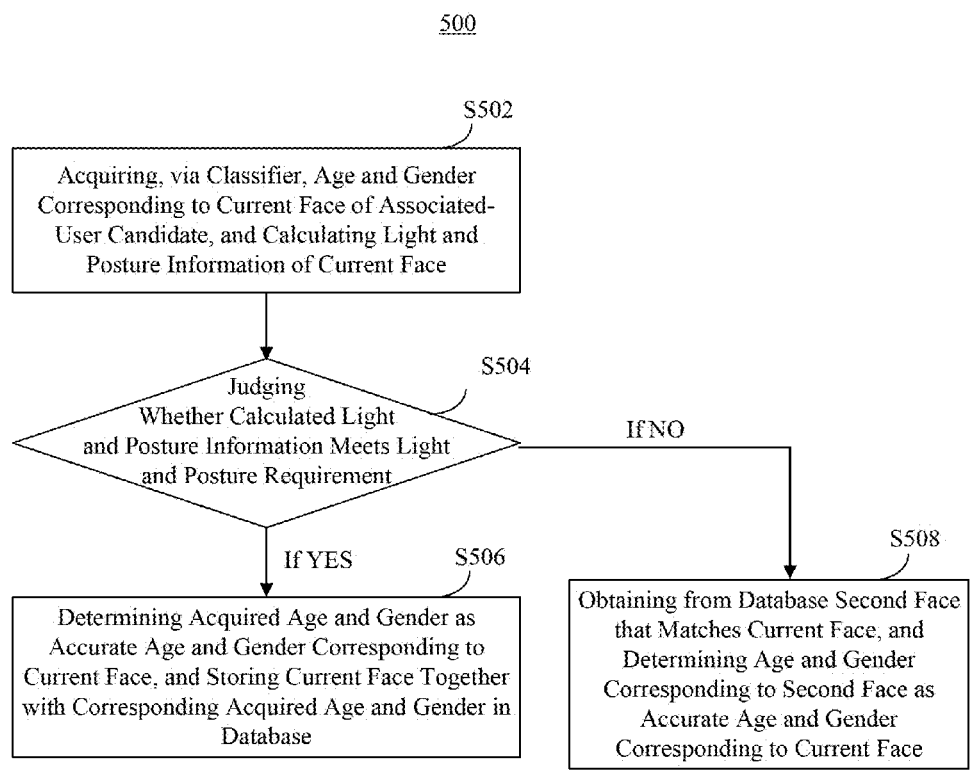
FIG. 5 is a flowchart of a method for acquiring an age and a gender corresponding to a face, according to an exemplary embodiment.

FIG. 5 is a flowchart of a method 500 for acquiring an age and a gender corresponding to a face, according to an exemplary embodiment. For example, the method 500 may be used in a mobile terminal. As shown in FIG. 5, the method 500 may include the following steps S502-S508.

In step S502, the mobile terminal acquires, via a classifier, the age and gender corresponding to a current face of an associated-user candidate, and calculates light and posture information of the current face.

Due to the differences in the shooting angles and lighting conditions for taking photos, identification results for the genders and ages corresponding to different faces of the same user may be inaccurate. In order to solve the problem, the method 500 calculates the light and posture information of the current face. For example, the mobile terminal may calculate the light information of the current face using an average value and a variance of pixel gray values associated with the current face.

In step S504, the mobile terminal judges whether the calculated light and posture information of the current face meets a light and posture requirement. If the requirement is met, the mobile terminal executes step S506. Otherwise, the mobile terminal executes step S508.

In one embodiment, the mobile terminal may judge whether a posture of the user is a front posture and whether the average value of the pixel gray values is within a preset range, e.g., 50-100. If the posture of the user is a front posture and the average value of the pixel gray values is in the range of 50-100, the mobile terminal may determine that the current face meets the light and posture requirement. Otherwise, the mobile terminal determines that the current face does not meet the light and posture requirement.

In exemplary embodiments, the mobile terminal may use various methods to judge whether the posture of the user is the front posture. For example, the mobile terminal may extract the positions of multiple points, such as positions of the left eye and the right eye, on the current face, and then judge whether the positions corresponding to the left eye and the right eye are symmetric. If the positions corresponding to the left eye and the right eye are symmetric, the mobile terminal may judge that the posture of the user is the front posture.

In step S506, the mobile terminal determines the acquired age and gender as the accurate age and gender corresponding to the current face, and stores the current face together with the corresponding acquired age and gender in a database.

As described in step S504, if the current face meets the light and posture requirement, the mobile terminal executes step S506. That is, the mobile terminal deems the acquired age and gender as the accurate age and gender corresponding to the current face, and stores the current face together with the acquired age and gender in the database for subsequent usages, such as being used for the matching purpose as described in step S508.

In step S508, the mobile terminal obtains, from the database, a second face that matches the current face, and determines the age and gender corresponding to the second face as the accurate age and gender corresponding to the current face.

For example, if the current face does not meet the light and posture requirement, such as when the current face is a profile and/or the light is dark, the acquired age and gender corresponding to the current face may not be accurate. Thus, to improve the accuracy, the mobile terminal may obtain from the database a second face that matches the current face, and use the age and gender corresponding to the second face as the accurate age and gender corresponding to the current face.

According to the method 500, when the current face meets the light and posture requirement, the acquired age and gender are directly determined as the accurate age and gender corresponding to the current face. However, when the current face does not meet the light and posture requirement, a second face matching the current face may be obtained from the database, and the age and gender of the second face are determined as the age and gender of the current face. In this manner, the accuracy of identify the age and gender corresponding to the current face is ensured.

Corresponding to the above-described methods, in the following the present disclosure further provides various device embodiment for implementing the methods.

Figure 6:
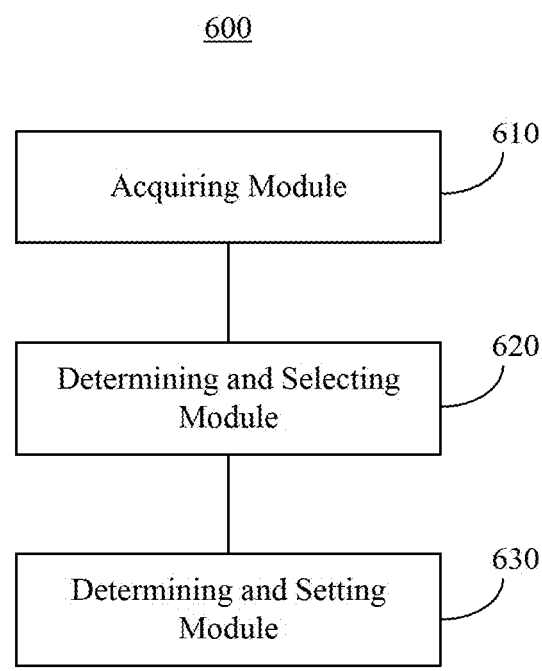
FIG. 6 is a block diagram of a device for determining an associated user, according to an exemplary embodiment.

FIG. 6 is a block diagram of a device 600 for determining an associated user, according to an exemplary embodiment. As shown in FIG. 6, the device 600 may include an acquiring module 610, a determining and selecting module 620, and a determining and setting module 630.

The acquiring module 610 is configured to acquire a face album. The face album includes face sets of multiple users.

The determining and selecting module 620 is configured to: determine a target user in the face album acquired by the acquiring module 610; and select at least one associated-user candidate of the target user from the face album.

The determining and setting module 630 is configured to: acquire attribute information of the at least one associated-user candidate selected by the determining and selecting module 620; determine an associated user of the target user according to the attribute information; and set tag information for the associated user.

Figure 7:
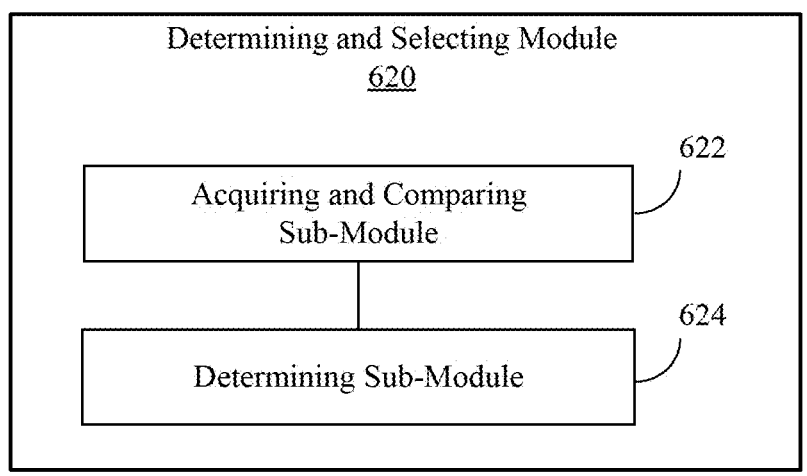
FIG. 7 is a block diagram of a determining and selecting module in the device of FIG. 6, according to an exemplary embodiment.

FIG. 7 is a block diagram of the determining and selecting module 620 (FIG. 6), according to an exemplary embodiment. As shown in FIG. 7, the determining and selecting module 620 may further include an acquiring and comparing sub-module 622 and a determining sub-module 624.

The acquiring and comparing sub-module 622 is configured to: acquire face-source photos of all the users in the face album; and compare the face-source photos of the target user with face-source photos of the other users.

The determining sub-module 624 is configured to: determine a user who has more than a preset number of same face-source photos as the target user; and select this user as an associated-user candidate.

Figure 8:
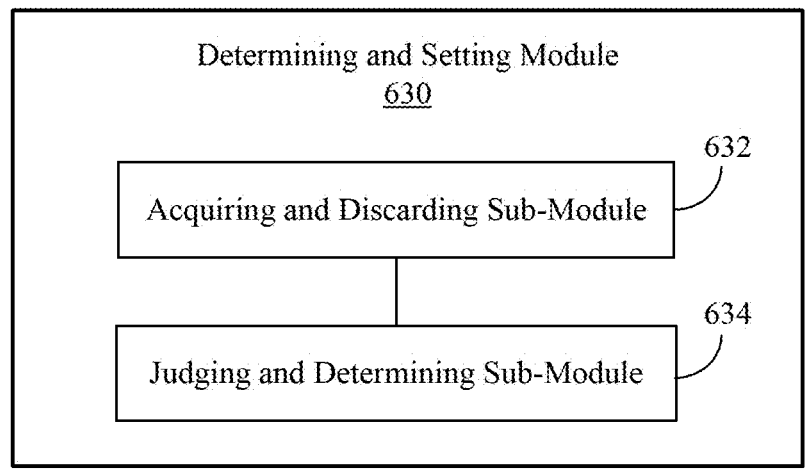
FIG. 8 is a block diagram of a determining and setting module in the device of FIG. 6, according to an exemplary embodiment.

FIG. 8 is a block diagram of the determining and setting module 630 (FIG. 6), according to an exemplary embodiment. As shown in FIG. 8, the determining and setting module 630 may further include an acquiring and discarding sub-module 632 and a judging and determining sub-module 634.

The acquiring and discarding sub-module 632 is configured to: acquire gender and age information of at least one associated-user candidate; and discard, according to the age information, an associated-user candidate not meeting an age requirement.

The judging and determining sub-module 634 is configured to: judge, according to gender information of the remaining associated-user candidate(s), whether the number of the remaining associated-user candidate(s) exceeds the number of the associated user(s); if the number of the remaining associated-user candidate(s) does not exceed the number of the associated user(s), determine the remaining associated-user candidate(s) as the associated user(s); and if the number of the remaining associated-user candidate(s) exceeds the number of the associated user(s), determine the associated user(s) according to a preset condition.

In one embodiment, the judging and determining sub-module 634 may be further configured to: obtain the face number(s) of the remaining associated-user candidates; and determine an associated-user candidate with the largest face number as an associated user.

Figure 9:
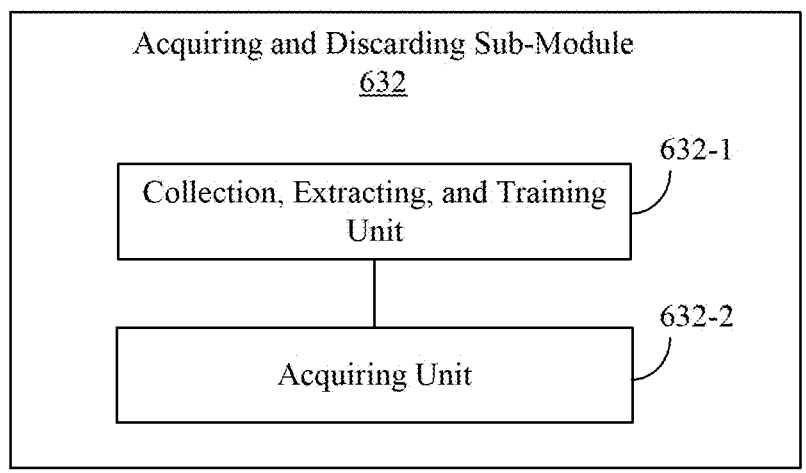
FIG. 9 is a block diagram of an acquiring and discarding sub-module in the determining and setting module of FIG. 8, according to an exemplary embodiment.

FIG. 9 is a block diagram of the acquiring and discarding sub-module 632 (FIG. 8), according to an exemplary embodiment. As shown in FIG. 9, the acquiring and discarding sub-module 632 may further include a collecting, extracting, and training unit 632-1, and an acquiring unit 632-2.

The collecting, extracting, and training unit 632-1 is configured to: collect training samples; extract characteristics of the training samples; and train one or more classifiers according to the characteristics. The characteristics may include a Gabor characteristic and the classifiers may include an SVM classifier.

The acquiring unit 632-2 is configured to acquire, via the one or more classifiers, the gender and age group of the at least one associated-user candidate.

In one embodiment, the acquiring unit 632-2 is further configured to: acquire, via the classifier, an age, a photo-taking time, and a gender corresponding to each face of an associated-user candidate; calculate a birth time corresponding to each face, according to the corresponding age and photo-taking time; determine, according to the calculated birth time, an age group to which the associated-user candidate belongs; if the faces of the associated-user candidate all have the same acquired gender, determine the acquired gender as the gender of the associated-user candidate; and if the faces of the associated-user candidate have different acquired genders, make a statistical determination on the number of faces corresponding to each gender, and determine a gender corresponding to a larger number of the faces as the gender of the associated-user candidate.

In one embodiment, the acquiring unit 632-2 is further configured to: calculate light and posture information of a current face of an associated-user candidate; if the calculated light and posture information meets a light and posture requirement, determine the acquired age and gender as the accurate age and gender corresponding to the current face, and store the current face together with the acquired age and gender corresponding to the current face in a database; and if the calculated light and posture information does not meet the light and posture requirement, obtain from a database a second face that matches the current face, and determine the age and gender corresponding to the second face as the accurate age and gender corresponding to the current face.

With respect to the devices in the above embodiments, the specific manners for individual modules/units and sub-modules therein to perform operations have been described in detail in the embodiments regarding the related methods, which will not be elaborated herein.

Figure 10:
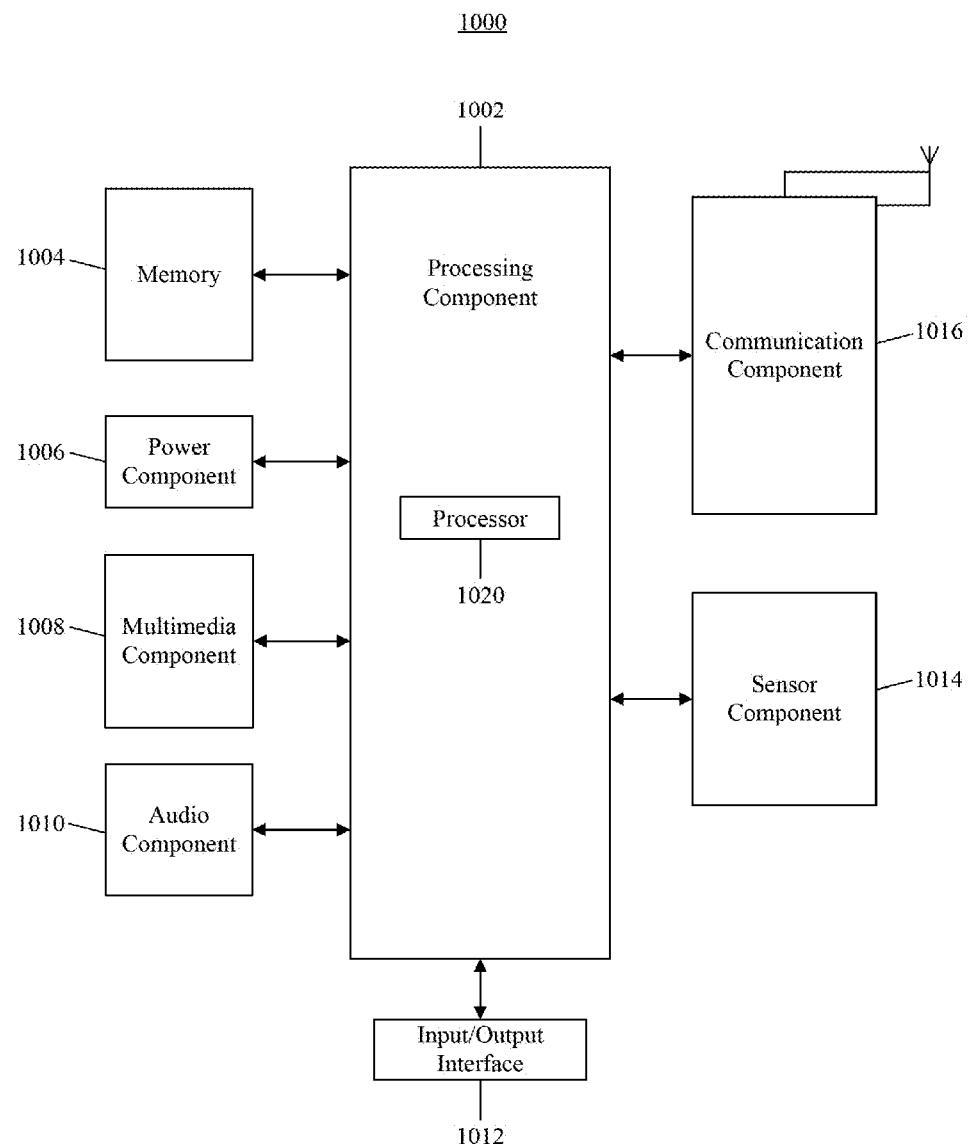
FIG. 10 is a block diagram of a device for determining an associated user, according to an exemplary embodiment.

FIG. 10 is a block diagram of a device 1000 for determining an associated user, according to an exemplary embodiment. For example, the device 1000 may be a mobile phone, a computer, a digital broadcast terminal, a message transceiver, a gaming console, a tablet device, a medical device, fitness equipment, a personal digital assistant, and the like.

Referring to FIG. 10, the device 1000 may include at least one of the following components: a processing component 1002, a memory 1004, a power component 1006, a multimedia component 1008, an audio component 1010, an input/output (I/O) interface 1012, a sensor component 1014, and a communication component 1016.

The processing component 1002 typically controls overall operations of the device 1000, such as the operations associated with display, telephone calls, data communications, camera operations, and recording operations. The processing component 1002 may include one or more processors 1020 to execute instructions so as to perform all or part of the steps in the abovementioned methods. Moreover, the processing component 1002 may include one or more modules which facilitate interaction between the processing component 1002 and other components. For instance, the processing component 1002 may include a multimedia module to facilitate interaction between the multimedia component 1008 and the processing component 1002.

The memory 1004 is configured to store various types of data so as to support operations in the device 1000. Examples of such data include instructions for any application or method operated on the device 1000, data of contacts, data of a phonebook, a message, a picture, a video, etc. The memory 1004 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1006 provides power for various components of the device 1000. The power component 1006 may include a power management system, one or more power supplies, and other components associated with generation, management and distribution of power of the device 1000.

The multimedia component 1008 includes a screen providing an output interface between the device 1000 and a user. In some embodiments, the screen may include a Liquid Crystal Display (LCD) and a Touch Panel (TP). If the screen includes a TP, the screen may be implemented as a touch screen to receive an input signal from the user. The TP includes one or more touch sensors to sense a touch, a slide and a gesture on the TP. The touch sensors may not only sense a boundary of a touch or slide action, but also sense a duration and pressure associated with the touch or slide action. In some embodiments, the multimedia component 1008 includes a front camera and/or a rear camera. The front camera and/or the rear camera may receive external multimedia data when the device 1000 is in an operation mode, such as a photographing mode or a video mode. Each of the front camera and the rear camera may be a fixed optical lens system or provided with a focal length and an optical zooming capability.

The audio component 1010 is configured to output and/or input an audio signal. For example, the audio component 1010 includes a microphone (MIC), and the MIC is configured to receive an external audio signal when the device 1000 is in the operation mode, such as a call mode, a recording mode and a voice recognition mode. The received audio signal may be further stored in the memory 1004 or sent through the communication component 1016. In some embodiments, the audio component 1010 further includes a loudspeaker configured to output the audio signal.

The I/O interface 1012 provides an interface between the processing component 1002 and a peripheral interface module. The peripheral interface module may be a keyboard, a click wheel, buttons and the like. The buttons may include, but not limited to: a home button, a volume button, a starting button and a locking button.

The sensor component 1014 includes one or more sensors configured to provide status assessment in various aspects for the device 1000. For instance, the sensor component 1014 may detect an on/off status of the device 1000 and relative positioning of components, such as a display and a keypad of the device 1000, and the sensor component 1014 may further detect a change in a position of the device 1000 or a component of the device 1000, presence or absence of contact between the user and the device 1000, orientation or acceleration/deceleration of the device 1000 and a change in temperature of the device 1000. The sensor component 1014 may include a proximity sensor configured to detect presence of an object nearby without any physical contact. The sensor component 1014 may also include an optical sensor, such as a Complementary Metal Oxide Semiconductor (CMOS) or Charge Coupled Device (CCD) image sensor, used in an imaging application. In some embodiments, the sensor component 1014 may also include an acceleration sensor, a gyroscope sensor, a magnetic sensor, a pressure sensor or a temperature sensor.

The communication component 1016 is configured to facilitate wired or wireless communication between the device 1000 and other devices. The device 1000 may access a communications-standard-based wireless network, such as WiFi, 2G, 3G, 4G, or a combination thereof. In an exemplary embodiment, the communication component 1016 receives a broadcast signal or broadcast-related information from an external broadcast management system through a broadcast channel In an exemplary embodiment, the communication component 1016 may further include a Near Field Communication (NFC) module to facilitate short-range communication. For example, the NFC module may be implemented on the basis of a Radio Frequency Identification (RFID) technology, an Infrared Data Association (IrDA) technology, an Ultra-WideBand (UWB) technology, a BlueTooth (BT) technology and another technology.

In an exemplary embodiment, the device 1000 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, so as to execute the abovementioned methods.

In an exemplary embodiment, there is also provided a non-transitory computer-readable storage medium including instructions, such as included in the memory 1004, executable by the processor 1020 of the device 1000, to implement the above-described methods. For example, the non-transitory computer-readable storage medium may be a ROM, a Radom Access Memory (RAM), a Compact Disc Read-Only Memory (CD-ROM), a magnetic tape, a floppy disc, an optical data storage device and the like.

Other embodiments of the present disclosure will be apparent to those skilled in the art from consideration of the specification and practice of the embodiments of the present disclosure disclosed here. This application is intended to cover any variations, uses, or adaptations of the embodiments of the present disclosure following the general principles thereof and including such departures from the embodiments of the present disclosure as come within known or customary practice in the art. The specification and embodiments should be considered as exemplary only, with the true scope and spirit of the embodiments of the present disclosure being indicated by the following claims.

It should be appreciated that the embodiments of the present disclosure are not limited to the exact construction described above and illustrated in the accompanying drawings, and that various modifications and changes can be made without departing from the scope thereof. The scope of the embodiments of the present disclosure is only limited by the appended claims.

What is claimed is:

1. A method for a device to determine an associated user, comprising:
    acquiring a face album including face sets of multiple users;
    determining a target user in the face album;
    selecting, from the face album, at least one associated-user candidate of the target user;
    acquiring attribute information of the at least one associated-user candidate, and determining an associated user of the target user according to the attribute information; and
    setting tag information for the associated user,
    wherein the acquiring of the attribute information of the at least one associated-user candidate and the determining of an associated user of the target user according to the attribute information comprise:
        acquiring age and gender information of a first associated-user candidate;
        when the first associated-user candidate does not meet an age requirement, discarding the first associated-user candidate not meeting the age requirement;
        judging, according to gender information of one or more remaining associated-user candidates, whether a number of the remaining associated-user candidates exceeds a number of associated users;
        if the number of the remaining associated-user candidates does not exceed the number of associated users, determining the remaining associated-user candidates as the associated users; and
        if the number of the remaining associated-user candidates exceeds the number of associated users, determining the associated users according to a preset condition.

2. The method according to claim 1, wherein the selecting, from the face album, of the at least one associated-user candidate of the target user comprises:
    acquiring face-source photos of each user in the face album;
    comparing face-source photos of the target user with face-source photos of other users in the face album; and
    determining the at least one associated-user candidate based on a comparison result, wherein the at least one associated-user candidate has more than a preset number of same face-source photos as the target user has.

3. The method according to claim 1, wherein the acquiring of the age and gender information of the first associated-user candidate comprises:
    collecting training samples;
    extracting one or more characteristics of the training samples, the characteristics including a Gabor characteristic;
    training one or more classifiers according to the characteristics, the classifiers including a Support Vector Machine (SVM) classifier; and
    acquiring, via the one or more classifiers, an age group and a gender of the first associated-user candidate.

4. The method according to claim 1, wherein the determining of the associated users according to the preset condition comprises:
    obtaining a face number of each of the remaining associated-user candidates; and
    determining a second associated-user candidate with a largest face number as an associated user.

5. The method according to claim 3, wherein the acquiring, via the one or more classifiers, of the age group and the gender of the first associated-user candidate comprises:
    acquiring, via the one or more classifiers, an age, a photo-taking time, and a gender corresponding to each face of the first associated-user candidate;

calculating a birth time corresponding to each face, according to the age and the photo-taking time corresponding to each face;
determining an age group of the first associated-user candidate, according to the birth time;
if all of the faces of the first associated-user candidate correspond to the same acquired gender, determining the acquired gender as the gender of the first associated-user candidate; and
if the faces of the first associated-user candidate correspond to different acquired genders, computing a number of the faces corresponding to each acquired gender, and determining an acquired gender corresponding to a larger number of the faces as the gender of the first associated-user candidate.

6. The method according to claim 5, further comprising:
computing light and posture information of a first face of the first associated-user candidate;
if the computed light and posture information meets a light and posture requirement, determining the acquired age and gender as an accurate age and gender corresponding to the first face, and storing the first face together with the corresponding acquired age and gender in a database; and
if the computed light and posture does not meet the light and posture requirement, obtaining from the database a second face that matches the first face, and determining a age and gender of the second face as the accurate age and gender of the first face.

7. A device, comprising:
a processor; and
a memory configured to store instructions executable by the processor;
wherein the processor is configured to:
acquire a face album including face sets of multiple users;
determine a target user in the face album;
select, from the face album, at least one associated-user candidates of the target user;
acquire attribute information of the at least one associated-user candidate, and determine an associated user of the target user according to the attribute information; and
set tag information for the associated user,
wherein in acquiring the attribute information of the at least one associated-user candidate, and determining an associated user of the target user according to the attribute information, the processor is further configured to:
acquire age and gender information of a first associated-user candidate;
when the first associated-user candidate does not meet an age requirement, discard the first associated-user candidate not meeting the age requirement;
judge, according to gender information of one or more remaining associated-user candidates, whether a number of the remaining associated-user candidates exceeds a number of associated users;
if the number of the remaining associated-user candidates does not exceed the number of associated users, determine the remaining associated-user candidates as the associated users; and
if the number of the remaining associated-user candidates exceeds the number of associated users, determine the associated users according to a preset condition.

8. The device according to claim 7, wherein the processor is further configured to:
acquire face-source photos of each user in the face album;
compare face-source photos of the target user with face-source photos of other users in the face album; and
determine the at least one associated-user candidate based on a comparison result, wherein the at least one associated-user candidate has more than a preset number of same face-source photos as the target user.

9. The device according to claim 7, wherein the processor is further configured to:
collect training samples;
extract one or more characteristics of the training samples, the characteristics including a Gabor characteristic;
train one or more classifiers according to the characteristics, the classifiers including a Support Vector Machine (SVM) classifier; and
acquire, via the one or more classifiers, an age group and a gender of the first associated-user candidate.

10. The device according to claim 7, wherein the processor is further configured to:
obtain a face number of each of the remaining associated-user candidates; and
determine a second associated-user candidate with a largest face number as an associated user.

11. The device according to claim 9, wherein the processor is further configured to:
acquire, via the one or more classifiers, an age, a photo-taking time, and a gender corresponding to each face of the first associated-user candidate;
calculate a birth time corresponding to each face, according to the age and the photo-taking time corresponding to each face;
determine an age group of the first associated-user candidate, according to the birth time;
if all of the faces of the first associated-user candidate correspond to the same acquired gender, determine the acquired gender as the gender of the first candidate associated-user candidate; and
if the faces of the first associated-user candidate correspond to different acquired genders, compute a number of the faces corresponding to each acquired gender, and determine an acquired gender corresponding to a larger number of the faces as the gender of the first associated-user candidate.

12. The device according to claim 11, wherein the processor is further configured to:
compute light and posture information of a first face of the first associated-user candidate;
if the computed light and posture information meets a light and posture requirement, determine the acquired age and gender as an accurate age and gender corresponding to the first face, and store the first face together with the corresponding acquired age and gender in a database; and
if the computed light and posture does not meet the light and posture requirement, obtain from the database a second face that matches the first face, and determine a age and gender of the second face as the accurate age and gender of the first face.

13. A non-transitory computer-readable storage medium storing instructions that, when executed by a processor of a terminal, cause the terminal to perform a method, comprising:

acquiring a face album including face sets of multiple users;

determining a target user in the face album;

selecting, from the face album, at least one associated-user candidate of the target user;

acquiring attribute information of the at least one associated-user candidate, and determining an associated user of the target user according to the attribute information; and setting tag information for the associated user, wherein the acquiring of the attribute information of the at least one associated-user candidate and the determining of the associated user of the target user according to the attribute information comprise:

acquiring age and gender information of a first associated-user candidate;

when the first associated-user candidate does not meet an age requirement, discarding the first associated-user not meeting the age requirement;

judging, according to gender information of one or more remaining associated-user candidates, whether a number of the remaining associated-user candidates exceeds a number of associated users;

if the number of the remaining associated-user candidates does not exceed the number of associated users, determining the remaining associated-user candidates as the associated users; and if the number of the remaining associated-user candidates exceeds the number of the associated users, determining the associated users according to a preset condition.

14. The medium according to claim 13, wherein the selecting, from the face album, of the at least one associated-user candidate of the target user comprises:

acquiring face-source photos of each user in the face album;

comparing face-source photos of the target user with face-source photos of other users in the face album; and determining the at least one associated-user candidate based on a comparison result, wherein the at least one associated-user candidate has more than a preset number of same face-source photos as the target user.

15. The medium according to claim 13, wherein the acquiring of the age and gender information of first associated-user candidate comprises:

collecting training samples;

extracting one or more characteristics of the training samples, the characteristics including a Gabor characteristic;

training one or more classifiers according to the characteristics, the classifiers including a Support Vector Machine (SVM) classifier; and acquiring, via the one or more classifiers, an age group and the gender of the first associated-user candidate.

16. The medium according to claim 13, wherein the determining of the associated users according to the preset condition comprises:

obtaining a face number of each of the remaining associated-user candidates; and determining a second associated-user candidate with a largest face number as an associated user.

17. The medium according to claim 15, wherein the acquiring, via the one or more classifiers, of the age group and the gender of the first associated-user candidate comprises:

acquiring, via the one or more classifiers, an age, a photo-taking time, and a gender corresponding to each face of the first associated-user candidate;

calculating a birth time corresponding to each face, according to the age and the photo-taking time corresponding to each face;

determining an age group of the first associated-user candidate, according to the birth time;

if all of the faces of the first associated-user candidate correspond to the same acquired gender, determining the acquired gender as the gender of the first associated-user candidate; and if the faces of the first associated-user candidate correspond to different acquired genders, computing a number of the faces corresponding to each acquired gender, and determining an acquired gender corresponding to a larger number of the faces as the gender of the first associated-user candidate.

* * * * *